United States Patent Office 3,011,992
Patented Dec. 5, 1961

3,011,992
COMPOSITION OF MATTER COMPRISING AN ACRYLONITRILE POLYMER AND AN ALKYL-AMINE BORANE AND SPINNING SOLUTIONS CONTAINING SAME
Kenneth H. Anderson, South Charleston, W. Va., assignor to Union Carbide Corporation, a corporation of New York
No Drawing. Filed Feb. 12, 1960, Ser. No. 8,249
23 Claims. (Cl. 260—32.4)

This invention relates to stabilized resin compositions. More particularly, it is concerned with stabilized acrylonitrile-containing resin compositions and spinning solutions.

As is well known in the art, acrylonitrile-containing resins will darken in color when heated, whether in solution or not. This darkening is undesirable, since it detracts from the visual appearance of the resins, and is particularly undesirable when the resin is converted to fibers, since the color formed makes the fibers less desirable aesthetically, and more difficult to dye properly. Attempts have been made to overcome this defect by the addition of various stabilizers to the resins, such as, for example, trialkyl phosphites, trialkyl phosphines, various organic tin salts, and a multiplicity of other compounds. None, however, have achieved the desired goal, even though some of the stabilizers heretofore used have shown some improvement.

It has now been found that the alkylamine boranes increase the resistance of acrylonitrile-containing polymers to decomposition by heat and light. The alkylamine boranes suitable for use in this invention can be represented by the general formula:

wherein R represents an alkyl radical containing from 1 to about 20 carbon atoms, R' represents a hydrogen atom or an alkyl radical containing from 1 to about 20 carbon atoms, and the sum total of the number of carbon atoms in the alkyl radicals R and R' must be at least 3. Thus it is seen that the stabilizers of this invention are the trialkylamine boranes represented by the general formula:

$$R_3N:BH_3$$

wherein R represents an alkyl radical containing from 1 to about 20 carbon atoms, and the dialkylamine boranes represented by the general formula:

wherein R represents an alkyl radical containing from 1 to about 20 carbon atoms, R" represents an alkyl radical containing from 2 to about 20 carbon atoms, and the sum total of the carbon atoms in the R and R" groups is at least 3. Illustrative of the alkylamine boranes which can be used in this invention are trimethylamine borane, triethylamine borane, tributylamine borane, trioctylamine borane, ethyl-dimethylamine borane, dimethyl-n-octylamine borane, dimethyl-n-dodecylamine borane, dipropyl-n-octylamine borane, methyl-dioctylamine borane, diethylamine borane, dibutylamine borane, propyl-butylamine borane, methyl-ethylamine borane, ethyl-propylamine borane, diisopentylamine borane, dioctyl-amine borane, methyl-n-octylamine borane, methyl-n-dodecylamine borane, and the like. These compounds are readily produced by procedures known in the art, for example, as reported in J. Am. Chem. Soc., 59, 780–7 (1939).

The amount of alkylamine borane stabilizer added to the acrylonitrile-containing resin can be varied from about 0.05% or less to about 5% or more by weight, based on the weight of the resin. The only requirement is that a stabilizing amount, sufficient to stabilize the resin against heat and light degradation, be added to the resin or solution thereof. The preferred concentration of alkylamine borane charged to the resin or to the resin solution is from about 0.1% to about 2% by weight. The stabilizer can be added to the resin by any of the conventional procedures well known to the art; however, it is most readily added by dissolving it with the resin in a suitable solvent.

The alkylamine boranes used as stabilizers in this invention can also be used in combination with the conventional, well known stabilizers heretofore used, as will be shown in the examples, without deleterious effects. Among some of the stabilizers that can be used with the alkylamine boranes one can mention dioctyltin bis(monoethyl maleate), dioctyltin maleate, tributyl phosphine, triisooctyl phosphite, tripropenyl phosphite, tributyl phosphonite, tetrabutyltin, trimethyltin chloride, tributyltin acetate, the diglycidyl ether of Bisphenol-A, and the like. These conventional stabilizers can be present at the concentrations usually employed, which are well known to the art.

The alkylamine boranes are especially useful in reducing the amount of discoloration that normally occurs when acrylonitrile-containing resins are heated during the preparation of spinning dope solutions for the production of fibers. The improved stabilization is also carried into the spun fiber or shaped article exposed to heat and light. The stabilizing effect is observed regardless of the conventional solution-forming organic solvent used in producing the solution. Illustrative of the organic solvents which can be used are acetonitrile, N,N-dimethylformamide, N,N-dimethylacetamide, ethylene carbonate, acetone, ethyl carbamate, gamma-butyrolactone, N-methyl-2-pyrrolidone, cyclohexanone, and the like.

The acrylonitrile-containing resins stabilized with the alkylamine boranes are the homopolymeric polyacrylonitriles and those polymers containing at least about 25% by weight of acrylonitrile. The fibers produced from acrylonitrile-containing resins which contain at least about 35% acrylonitrile have been given the generic names of acrylic and modacrylic fibers by the Federal Trade Commission, under the provisions of the Textile Fiber Products Identification Act enacted by Congress on September 2, 1958. The materials copolymerized with the acrylonitrile are those ethylenically unsaturated monomers copolymerizable therewith containing at least one olefinic (>C=C<) double bond in the molecule, such as in vinyl chloride, vinylidene chloride, vinyl acetate, methyl methacrylate, styrene, allyl acetate, butadiene, and the like. The term "acrylonitrile-containing resins" is used in this specification to include homopolymers, copolymers, etc. These are well known to the art, and can be readily prepared, for example, as described in U.S. 2,420,330, U.S. 2,603,620 and U.S. 2,868,756.

The color of the resin solutions is expressed in Gardner color units using a 20% solution of resin in acetone. The resin and stabilizer are dissolved in acetone by heating at 50° C. for 30 minutes while stirring the mixture; then the solution is heated at 80° C. for two hours, and the Gardner color value again determined. Low Gardner color values are preferred, with higher members representing darker colors. The Gardner color value is determined by comparing the color intensity of the test liquid with permanent glass color standards corresponding to the 1933 color series of the Institute of Paint and Varnish Research, using the Hellige color comparator and color disc (varnish No. 620C–40). The glass sample tube is filled with the solution whose color intensity is to be determined, and it is then inserted in the Hellige comparator for comparison with the standard colors on the disc. The disc is rotated until a color match is made between the test solution and the glass color standard, and the color intensity is read off the comparator.

On heating a spinning dope of an acrylonitrile-containing resin, preparatory to spinning the resin, considerable yellowing can occur from the time the resin has been dissolved to the time spinning has been completed. For example, a 20% by weight acetone solution of a resin having about a 40/60 ratio of acrylonitrile and vinyl chloride, had an original Gardner color value, prior to heating, of 1. After heating for two hours at 80° C., the unstabilized solution had a Gardner color value of 7, indicating appreciable yellowness. The addition of 2% by weight of the resin of di(2-ethylhexyl)tin maleate, a commonly used stabilizer, to the solution gave a Gardner color value of 6 after heating for two hours at 80° C. When only 1% based on the weight of the resin of trimethylamine borane was added to the resin solution, the Gardner color value was only 4 after heating for two hours at 80° C., indicative of much less color formation with only half as much stabilizer.

The alkylamine boranes are also effective when they are used in combination with the conventional well-known stabilizers, as can be seen from the data in the following table. In this table, an acrylonitrile/vinyl chloride resin having about a 40/60 ratio was used to prepare a 20% by weight solution in acetone; each stabilizer was added at a 1% by weight concentration, based on the weight of the resin. The mixtures were first heated at 50° C. for 30 minutes to dissolve the resin and were then heated at 80° C. for two hours to determine the stabilizing effect of the resin. It can be seen that trimethylamine borane was a much more effective stabilizer for the resin whether used alone or in combination with the conventional stabilizers heretofore employed.

| Stabilizer | Gardner Color Value |
|---|---|
| Trimethylamine borane | 4 |
| Trimethylamine borane plus dioctyltin maleate | 4 |
| Trimethylamine borane plus dioctyltin bis(monoethyl maleate) | 4 |
| Triisooctyl phosphite plus dioctyltin maleate | 7 |
| Triisooctyl phosphite plus dioctyltin bis(monoethyl maleate) | 7 |
| Tributyl phosphine plus dioctyltin maleate | 7 |
| Tributyl phosphine plus dioctyltin bis(monoethyl maleate) | 8 |

The following examples further serve to define the invention, but are not to be construed as limiting it thereto.

EXAMPLE 1

Pyrex bombs containing 24 g. of acetone were immersed in an acetone-dry ice bath to chill the acetone. The stabilizer to be tested, 0.06 g., 1% by weight on the resin weight basis, was added to the acetone in each bomb. Then 6 g. of a copolymer containing about 40% acrylonitrile and 60% vinyl chloride, and having a specific viscosity of 0.261, as measured from a 0.2% solution of the resin in cyclohexanone at 20° C., was added. The bombs were sealed and rotated in a thermostated water bath at 50° C. for 30 minutes to dissolve the resin. The temperature of the resin solutions was raised to 80° C. to produce solutions which would be suitable for the spinning of synthetic fibers. After two hours at 80° C. the Gardner color value of the solutions was determined; lower Gardner numbers represent more effective stabilization. The results are tabulated below.

Gardner color value

Trimethylamine borane _____ 4
Methyl-di(n-octadecyl)amine borane _____ 5
Dimethyl-n-dodecylamine borane _____ 5

EXAMPLE 2

One pint pressure bottles, each containing 150 g. of acetonitrile, were chilled in an acetone-dry ice bath. Then the indicated weight percent, based on the weight of the resin, of the desired stabilizer was dissolved in each of the bottles. Fifty grams of a copolymer of about 40% acrylonitrile and about 60% vinyl chloride, was added and the bottles were sealed and rotated in a water bath at 50° C. for 30 minutes to dissolve the resin. The solutions were then heated at 80° C. for two hours; and the resin solution color values (RSCV) were determined quantitatively. The RSCV determination is made by measuring the light transmission at wave lengths of 430 millimicrons and 600 millimicrons through dimethylformamide solutions containing 4% resin. The resin solution is prepared by weighing out approximately 5 g. of the above solution into a vial, and then adding a vcolume of dimethylformamide in milliliters equal to 5.3 times the weight of the resin solution in grams. The dimethylformamide contains 5 ml. of glacial acetic acid per liter. The color value of the solution so prepared is determined using a Beckman spectrophotometer, model B, and is calculated by dividing the precent transmission at 430 millimicrons by the percent transmission at 600 millimicrons. Control runs are carried out in the same manner, but without the addition of any stabilizer. The results obtained are tabulated in Table I. Solution A was an acetone solution of a 40/60 acrylonitrile/vinyl chloride copolymer having a specific viscosity of 0.257 as measured on a 0.2% solution of the resin in dimethylformamide at 29° C. Solution B is an acetonitrile solution of the same resin. Solution C is an acetone solution of a similar resin having a specific viscosity of 0.264 as measured on a 0.2% solution in cyclohexane at 20° C. Solution D is an acetonitrile solution of the same resin used in Solution C.

Table I

| Stabilizer | RSCV | | | |
|---|---|---|---|---|
| | Sol. A | Sol. B | Sol. C | Sol. D |
| Trimethylamine borane, 2% | 81.0 | 91.0 | 81.0 | 92.0 |
| Trimethylamine borane, 0.5% | | 89.2 | | |
| Methyl-di(n-octadecyl)amine borane, 2% | 76.7 | 85.0 | 82.0 | 80.0 |
| Methyl-di(n-octadecyl)amine borane, 0.5% | | 82.6 | | |
| Dimethyl-n-dodecylamine borane, 2% | 79.1 | 88.0 | 82.0 | 86.0 |
| Dimethyl-n-dodecylamine borane, 0.5% | | 81.8 | | |
| Diisooctylamine borane, 2% | | 91.0 | | |
| Diisooctylamine borane, 1% | | 92.0 | | |
| Di(2-ethylhexyl)tin maleate, 2% | 70.0 | 78.0 | | |
| No stabilizer | 62.6 | 63.0 | 66.0 | 58.0 |

The stabilizing effect of the alkylamine boranes is clearly evident from the above data. It is also evident that they are more efficient stabilizers than the conventional tin stabilizer at equal concentrations.

EXAMPLE 3

A terpolymer containing about 69% acrylonitrile, about 20% vinyl chloride and about 11% vinylidene chloride was dissolved in acetonitrile to produce a 25% resin solution in a manner similar to that described in Example 1. Also present in each Pyrex bomb was the stabilizer indicated below. A control solution having no stabilizer was also prepared. These resin solutions were spun into staple fibers by similar extrusion and coagulation procedures in accordance with conventional spinning techniques. The fibers were tested for light stability by measuring the percent reflectance of monochromatic light at a wavelength of 440 millimicrons. The test fibers were mounted on cards and readings were taken initially and at twenty hour intervals for a total period of 80 hours of exposure in an Atlas Fade-O-Meter at a temperature of 145° F. The results are tabulated below; "reflectance value" represents the percent light reflectance of the fiber after exposure in the Fade-O-Meter for the indicated period of time. High reflectance values are preferred. Also included is the rate of darkening of the fiber; in this instance low values are preferred. The rate of darkening (K/S') is one approach to giving a quantitative value to light stability. Reflectance values are converted to K/S values by the following equation:

$$K/S = (1-R)^2/2R$$

By plotting K/S values versus the hours of exposure ×10⁴, a straight line is obtained, the slope of which is reported as K/S'. This value is directly proportional to the rate of yellowing during exposure to light, with lower numbers indicating better stability.

| Stabilizer, On Resin Basis | Reflectance, After—Hours in Fade-O-Meter | | | | | Rate of Darkening K/S' |
|---|---|---|---|---|---|---|
| | 0 | 20 | 40 | 60 | 80 | |
| Trimethylamine borane, 1% | 76 | 56 | 48 | 42 | 37 | 31 |
| Trimethylamine borane, 2% | 77 | 58 | 52 | 46 | 42 | 48 |
| Trimethylamine borane plus di(2-ethylhexyl)tin maleate, 1% each | 79 | 73 | 68 | 63 | 59 | 15 |
| None, control | 67 | 49 | 41 | 36 | 33 | 81 |

It can readily be observed that the compositions containing the trimethylamine borane have improved properties over the control.

What is claimed is:

1. A composition of matter, comprising an acrylonitrile-containing resin selected from the group consisting of homopolymers of acrylonitrile and copolymers of acrylonitrile with an ethylenically unsaturated monomer copolymerizable therewith, said copolymers containing at least 25 percent by weight of acrylonitrile copolymerized therein, and a stabilizing amount, sufficient to stabilize said resin against heat and light degradation, of an alkylamine borane represented by the general formula:

wherein R represents an alkyl radical containing from 1 to about 20 carbon atoms, R' represents a member selected from the group consisting of a hydrogen atom and an alkyl radical containing from 1 to about 20 carbon atoms, and wherein the sum total of the number of carbon atoms in the alkyl radicals R and R' must be at least 3.

2. A composition of matter, comprising an acrylonitrile-containing resin selected from the group consisting of homopolymers of acrylonitrile and copolymers of acrylonitrile with an ethylenically unsaturated monomer copolymerizable therewith, said copolymers containing at least 25 percent by weight of acrylonitrile copolymerized therein, and from about 0.05% to about 5% by weight, based on the weight of said resin, of an alkylamine borane represented by the general formula:

wherein R represents an alkyl radical containing from 1 to about 20 carbon atoms, R' represents a member selected from the group consisting of a hydrogen atom and an alkyl radical containing from 1 to about 20 carbon atoms, and wherein the sum total of the number of carbon atoms in the alkyl radicals R and R' must be at least 3.

3. A composition of matter, comprising an acrylonitrile-containing resin selected from the group consisting of homopolymers of acrylonitrile and copolymers of acrylonitrile with an ethylenically unsaturated monomer copolymerizable therewith, said copolymers containing at least 25 percent by weight of acrylonitrile copolymerized therein, and from about 0.1% to about 2% by weight, based on the weight of said resin, of a trialkylamine borane in which each alkyl radical contains from 1 to about 20 carbon atoms.

4. A composition of matter, comprising an acrylonitrile-containing resin selected from the group consisting of homopolymers of acrylonitrile and copolymers of acrylonitrile with an ethylenically unsaturated monomer copolymerizable therewith, said copolymers containing at least 25 percent by weight of acrylonitrile copolymerized therein, and from about 0.1% to about 2% by weight, based on the weight of said resin, of a dialkylamine borane in which the sum total of the number of carbon atoms in the alkyl radicals thereof is at least 3.

5. A composition of matter, comprising an acrylonitrile-containing resin selected from the group consisting of homopolymers of acrylonitrile and copolymers of acrylonitrile with an ethylenically unsaturated monomer copolymerizable therewith, said copolymers containing at least 25 percent by weight of acrylonitrile copolymerized therein, and from about 0.05% to about 5% by weight, based on the weight of said resin, of trimethylamine borane.

6. A composition of matter, comprising an acrylonitrile-containing resin selected from the group consisting of homopolymers of acrylonitrile and copolymers of acrylonitrile with an ethylenically unsaturated monomer copolymerizable therewith, said copolymers containing at least 25 percent by weight of acrylonitrile copolymerized therein, and from about 0.05% by weight to about 5% by weight, based on the weight of said resin, of methyl-di(n-octadecyl)amine borane.

7. A composition of matter, comprising an acrylonitrile-containing resin selected from the group consisting of homopolymers of acrylonitrile and copolymers of acrylonitrile with an ethylenically unsaturated monomer copolymerizable therewith, said copolymers containing at least 25 percent by weight of acrylonitrile copolymerized therein, and from about 0.05% to about 5% by weight, based on the weight of said resin, of dimethyl-n-dodecylamine borane.

8. A spinning solution, comprising an organic solvent, an acrylonitrile-containing resin selected from the group consisting of homopolymers of acrylonitrile and copolymers of acrylonitrile with an ethylenically unsaturated monomer copolymerizable therewith, said copolymers containing at least 25 percent by weight of acrylonitrile copolymerized therein, and a stabilizing amount, sufficient to stabilize said resin against heat and light degradation, of an alkylamine borane represented by the general formula:

wherein R represents an alkyl radical containing from 1 to about 20 carbon atoms, R' represents a member selected from the group consisting of a hydrogen atom and an alkyl radical containing from 1 to about 20 carbon atoms, and wherein the sum total of the number of carbon atoms in the alkyl radicals R and R' must be at least 3.

9. A spinning solution, comprising an organic solvent, an acrylonitrile-containing resin selected from the group consisting of homopolymers of acrylonitrile and copolymers of acrylonitrile with an ethylenically unsaturated monomer copolymerizable therewith, said copolymers containing at least 25 percent by weight of acrylonitrile copolymerized therein, and from about 0.05% to about 5% by weight, based on the weight of said resin, of an alkylamine borane represented by the general formula:

wherein R represents an alkyl radical containing from 1 to about 20 carbon atoms, R' represents a member selected from the group consisting of a hydrogen atom and an alkyl radical containing from 1 to about 20 carbon atoms, and wherein the sum total of the number of carbon atoms in the alkyl radicals R and R' must be at least 3.

10. A spinning solution, comprising an organic solvent, an acrylonitrile-containing resin selected from the group consisting of homopolymers of acrylonitrile and copolymers of acrylonitrile with an ethylenically unsaturated monomer copolymerizable therewith, said copolymers containing at least 25 percent by weight of acrylonitrile copolymerized therein, and from about 0.1% to about 2% by weight, based on the weight of said resin, of a trialkylamine borane in which each alkyl radical contains from 1 to about 20 carbon atoms.

11. A spinning solution, comprising an organic solvent, an acrylonitrile-containing resin selected from the group consisting of homopolymers of acrylonitrile and copolymers of acrylonitrile with an ethylenically unsaturated monomer copolymerizable therewith, said copolymers containing at least 25 percent by weight of acrylonitrile copolymerized therein, and from about 0.1% to about 2% by weight, based on the weight of said resin, of a dialkylamine borane in which the sum total of the number of carbon atoms in the alkyl radicals thereof is at least 3.

12. A spinning solution, comprising an organic solvent, an acrylonitrile-containing resin selected from the group consisting of homopolymers of acrylonitrile and copolymers of acrylonitrile with an ethylenically unsaturated monomer copolymerizable therewith, said copolymers containing at least 25 percent by weight of acrylonitrile copolymerized therein, and from about 0.05% to about 5% by weight, based on the weight of said resin, of trimethylamine borane.

13. A spinning solution, comprising an organic solvent, an acrylonitrile-containing resin selected from the group consisting of homopolymers of acrylonitrile and copolymers of acrylonitrile with an ethylenically unsaturated monomer copolymerizable therewith, said copolymers containing at least 25 percent by weight of acrylonitrile copolymerized therein, and from about 0.05% to about 5% by weight, based on the weight of said resin, of methyl-di(n-octadecyl)amine borane.

14. A spinning solution, comprising an organic solvent, an acrylonitrile-containing resin selected from the group consisting of homopolymers of acrylonitrile and copolymers of acrylonitrile with an ethylenically unsaturated monomer copolymerizable therewith, said copolymers containing at least 25 percent by weight of acrylonitrile copolymerized therein, and from about 0.05% to about 5% by weight, based on the weight of said resin, of dimethyl-n-dodecylamine borane.

15. A spinning solution, comprising acetonitrile, an acrylonitrile-containing resin selected from the group consisting of homopolymers of acrylonitrile and copolymers of acrylonitrile with an ethylenically unsaturated monomer copolymerizable therewith, said copolymers containing at least 25 percent by weight of acrylonitrile copolymerized therein, and from about 0.05% to about 5% by weight, based on the weight of said resin, of an alkylamine borane represented by the general formula:

wherein R represents an alkyl radical containing from 1 to about 20 carbon atoms, R' represents a member selected from the group consisting of a hydrogen atom and an alkyl radical containing from 1 to about 20 carbon atoms, and wherein the sum total of the number of carbon atoms in the alkyl radicals R and R' must be at least 3.

16. A spinning solution, comprising acetonitrile, an acrylonitrile-containing resin selected from the group consisting of homopolymers of acrylonitrile and copolymers of acrylonitrile with an ethylenically unsaturated monomer copolymerizable therewith, said copolymers containing at least 25 percent by weight of acrylonitrile copolymerized therein, and from about 0.1% to about 2% by weight based on the weight of said resin, of a trialkylamine borane in which each alkyl radical contains from 1 to about 20 carbon atoms.

17. A spining solution, comprising acetonitrile, an acrylonitrile-containing resin selected from the group consisting of homopolymers of acrylonitrile and copolymers of acrylonitrile with an ethylenically unsaturated monomer copolymerizable therewith, said copolymers containing at least 25 percent by weight of acrylonitrile copolymerized therein, and from about 0.1% to about 2% by weight, based on the weight of said resin, of a dialkylamine borane in which the sum total of the number of carbon atoms in the alkyl radicals thereof is at least 3.

18. A spinning solution, comprising dimethylformamide, an acrylonitrile-containing resin selected from the group consisting of homopolymers of acrylonitrile and copolymers of acrylonitrile with an ethylenically unsaturated monomer copolymerizable therewith, said copolymers containing at least 25 percent by weight of acrylonitrile copolymerized therein, and from about 0.05% to about 5% by weight, based on the weight of said resin, of an alkylamine borane represented by the general formula:

wherein R represents an alkyl radical containing from 1 to about 20 carbon atoms, R' represents a member selected from the group consisting of a hydrogen atom and an alkyl radical containing from 1 to about 20 carbon atoms, and wherein the sum total of the number of carbon atoms in the alkyl radicals R and R' must be at least 3.

19. A spinning solution, comprising dimethylformamide, an acrylonitrile-containing resin selected from the group consisting of homopolymers and acrylonitrile and copolymers of acrylonitrile with an ethylenically unsaturated monomer copolymerizable therewith, said copolymers containing at least 25 percent by weight of acrylonitrile copolymerized therein, and from about 0.1% to about 2% by weight, based on the weight of said resin, of a trialkylamine borane in which each alkyl radical contains from 1 to about 20 carbon atoms.

20. A spinning solution comprising dimethylformamide, an acrylonitrile-containing resin selected from the group consisting of homopolymers of acrylonitrile and copolymers of acrylonitrile with an ethylenically unsaturated monomer copolymerizable therewith, said copolymers containing at least 25 percent by weight of acrylonitrile copolymerized therein, and from about 0.1% to about 2% by weight, based on the weight of said resin, of a dialkylamine borane in which the sum total of the number of carbon atoms in the alkyl radicals thereof is at least 3.

21. A spinning solution, comprising acetone, an acrylonitrile-containing resin selected from the group consisting of homopolymers of acrylonitrile and copolymers of acrylonitrile with an ethylenically unsaturated monomer copolymerizable therewith, said copolymers containing at least 25 percent by weight of acrylonitrile copolymerized therein, and from about 0.05% to about 5% by weight, based on the weight of said resin, of an alkylamine borane represented by the general formula:

wherein R represents an alkyl radical containing from 1 to about 20 carbon atoms, R' represents a member selected from the group consisting of a hydrogen atom and an alkyl radical containing from 1 to about 20 carbon atoms, and wherein the sum total of the number of carbon atoms in the alkyl radicals R and R' must be at least 3.

22. A spinning solution, comprising acetone, an acrylonitrile-containing resin selected from the group consisting of homopolymers of acrylonitrile and copolymers of acrylonitrile with an ethylenically unsaturated monomer copolymerizable therewith, said copolymers containing at least 25 percent by weight of acrylonitrile copolymerized therein, and from about 0.1% to about 2% by weight, based on the weight of said resin, of a trialkylamine borane in which each alkyl radical contains from 1 to about 20 carbon atoms.

23. A spinning solution, comprising acetone, an acrylonitrile-containing resin selected from the group consisting of homopolymers of acrylonitrile and copolymers of acrylonitrile with an ethylenically unsaturated monomer copolymerizable therewith, said copolymers containing at least 25 percent by weight of acrylonitrile copolymerized therein, and from about 0.1% to about 2% by weight, based on the weight of said resin, of a dialkylamine borane in which the sum total of the number of carbon atoms in the alkyl radicals thereof is at least 3.

No references cited.